United States Patent
Hong et al.

(10) Patent No.: US 10,140,974 B2
(45) Date of Patent: Nov. 27, 2018

(54) METHOD AND APPARATUS FOR SPEECH RECOGNITION

(71) Applicant: SAMSUNG ELECTRONICS CO., LTD., Suwon-si (KR)

(72) Inventors: Seokjin Hong, Hwaseong-si (KR); YoungSang Choi, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 4 days.

(21) Appl. No.: 14/751,654

(22) Filed: Jun. 26, 2015

(65) Prior Publication Data
US 2016/0189710 A1    Jun. 30, 2016

(30) Foreign Application Priority Data
Dec. 29, 2014 (KR) .................. 10-2014-0192711

(51) Int. Cl.
    *G10L 15/02* (2006.01)
(52) U.S. Cl.
    CPC ........ *G10L 15/02* (2013.01); *G10L 2015/025* (2013.01); *G10L 2015/027* (2013.01)
(58) Field of Classification Search
    CPC ....... G10L 15/02; G10L 15/22; G10L 15/265; G10L 2015/025; G10L 2015/223
    USPC ......................................................... 704/235
    See application file for complete search history.

(56) References Cited

U.S. PATENT DOCUMENTS

| | | | |
|---|---|---|---|
| 7,392,185 B2 | 6/2008 | Bennett | |
| 7,729,904 B2 | 6/2010 | Bennett | |
| 2008/0094467 A1* | 4/2008 | An | H04N 7/142 348/14.02 |
| 2010/0100379 A1* | 4/2010 | Abe | G10L 15/18 704/235 |
| 2013/0226576 A1* | 8/2013 | Jaiswal | G10L 21/003 704/235 |
| 2014/0350934 A1* | 11/2014 | Li | G10L 15/1815 704/249 |
| 2016/0147740 A1* | 5/2016 | Gao | G06F 17/289 704/2 |
| 2017/0186422 A1* | 6/2017 | Lev-Tov | G06F 17/30389 |

FOREIGN PATENT DOCUMENTS

| | | |
|---|---|---|
| JP | 3428309 B2 | 7/2003 |
| JP | 4105841 B2 | 6/2008 |
| JP | 4783449 B2 | 9/2011 |
| JP | 5239863 B2 | 7/2013 |
| KR | 10-0366601 B1 | 1/2003 |
| KR | 10-2005-0083547 A | 8/2005 |
| KR | 10-0639931 B1 | 11/2006 |
| KR | 10-0668297 B1 | 1/2007 |
| KR | 10-1122590 B1 | 3/2012 |
| KR | 10-1210432 B1 | 12/2012 |

\* cited by examiner

*Primary Examiner* — Bharatkumar S Shah
(74) *Attorney, Agent, or Firm* — NSIP Law

(57) ABSTRACT

A method and apparatus for speech recognition are disclosed. The speech recognition apparatus includes a processor configured to process a received speech signal, generate a word sequence based on a phoneme sequence generated from the speech signal, generate a syllable sequence corresponding to a word element among words comprised in the word sequence based on the phoneme sequence, and determine a text corresponding to a recognition result of the speech signal based on the word sequence and the syllable sequence.

12 Claims, 6 Drawing Sheets

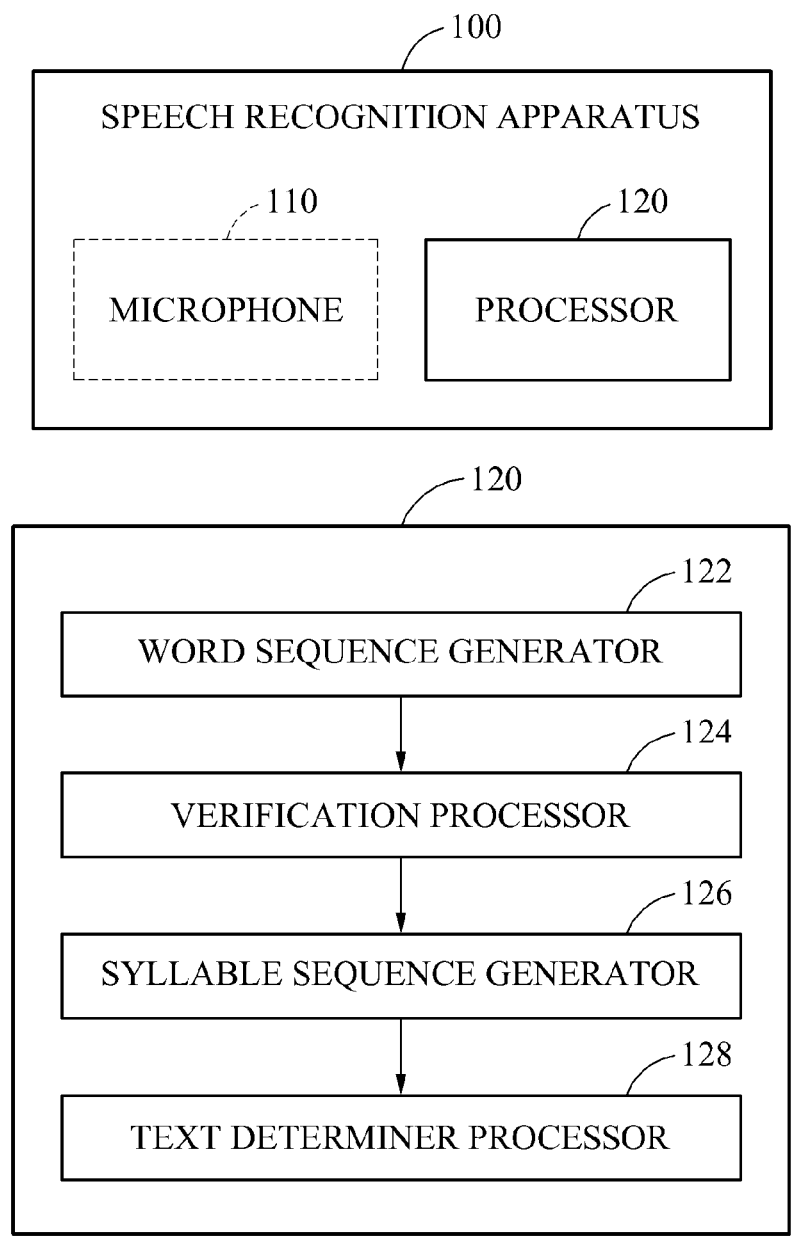

METHOD AND APPARATUS FOR SPEECH RECOGNITION

CROSS-REFERENCE TO RELATED APPLICATION(S)

This application claims the benefit under 35 USC 119(a) of Korean Patent Application No. 10-2014-0192711, filed on Dec. 29, 2014, in the Korean Intellectual Property Office, the entire disclosure of which is incorporated herein by reference for all purposes.

BACKGROUND

1. Field

The following description relates to a method and apparatus for speech recognition.

2. Description of Related Art

A speech interface to deliver voice commands is a more natural and intuitive interface than a touch interface. The speech interface makes human interaction with computers possible through a voice or speech platform in order to initiate an automated action, service, or process. Thus, the speech interface is gaining attention as a next-generation interface to compensate for flaws found in the touch interface. The core of the speech interface is accuracy to recognize a user's voice command or in a speech recognition technology. Accordingly, various methods of enhancing the accuracy of speech recognition technology are proposed and the speech recognition technology has been gradually developed.

A word sequence output as a speech recognition result is constituted of words registered in a phonetic dictionary. Accordingly, registration of a large number and diversity of words in the phonetic dictionary is required in order to enhance the accuracy in speech recognition technology. However, every existing combination of words may not be easily registered in the phonetic dictionary due to a restriction, for example, a size of a memory included in a speech recognition apparatus.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In accordance with an embodiment, there is provided a speech recognition method, including generating, using a processor, a word sequence based on a phoneme sequence generated from a speech signal; generating, using the processor, a syllable sequence, corresponding to a word element among words comprised in the word sequence, based on the phoneme sequence; and determining, using the processor, a text corresponding to a recognition result of the speech signal based on the word sequence and the syllable sequence.

The determining of the text may include determining the text by substituting the word element in the word sequence for the syllable sequence.

The word element may correspond to a word having a lower recognition rate than a threshold value among the words comprised in the word sequence.

Among the words comprised in the word sequence, the word element may correspond to a word having a lower recognition rate than a relative threshold value determined based on recognition rates of the words.

The word sequence may be generated by decoding the phoneme sequence in a word unit and comprises a text converted from the speech signal.

The generating of the syllable sequence may include generating the syllable sequence by decoding a portion corresponding to the word element, among phonemes comprised in the phoneme sequence.

The generating of the syllable sequence may be based on the phoneme sequence comprises generating the syllable sequence by decoding a syllable unit using a syllable unit phonetic dictionary, in which a phoneme sequence comprising a syllable is modeled, and a syllable unit language model, in which a syllable sequence comprising a word is modeled.

The syllable sequence may include a word excluded from a word unit phonetic dictionary used to generate the word sequence based on the phoneme sequence.

In accordance with an embodiment, there is provided a speech recognition method, including generating, using a processor, a word sequence by decoding a phoneme sequence generated from a speech signal of a user in a word unit; generating, using the processor, a syllable sequence corresponding to the word element based on the phoneme sequence in response the word element comprising a lower recognition rate than a threshold rate among words in the word sequence; and determining, using the processor, a text corresponding to a recognition result of the speech signal based on the word sequence and the syllable sequence.

The generating of the syllable sequence may include generating the syllable sequence by decoding a portion corresponding to the word element among phonemes comprised in the phoneme sequence.

The determining of the text may include determining by substituting the word element in the word sequence for the syllable sequence.

The threshold value may be one of a threshold value from the user and a relative threshold value determined based on recognition rates of the words comprised in the word sequence.

In accordance with another embodiment, there is provided a computer program embodied on a non-transitory computer readable medium, the computer program being configured to control a processor to perform the method described above.

In accordance with an embodiment, there is provided a speech recognition apparatus, including a processor configured to process a received speech signal, generate a word sequence based on a phoneme sequence generated from the speech signal, generate a syllable sequence corresponding to a word element among words comprised in the word sequence based on the phoneme sequence, and determine a text corresponding to a recognition result of the speech signal based on the word sequence and the syllable sequence.

The processor may be configured to determine the text by substituting the word element in the word sequence for the syllable sequence.

The word element may correspond to a word having a lower recognition rate than a threshold value among the words comprised in the word sequence.

Among the words comprised in the word sequence, the word element may correspond to a word having a lower recognition rate than a threshold value determined based on recognition rates of the words.

The word sequence may be generated by decoding the phoneme sequence in a word unit and comprises a text converted from the speech signal.

The processor may be further configured to generate the syllable sequence by decoding a portion corresponding to the word element among phonemes comprised in the phoneme sequence.

In accordance with an embodiment, there is provided a speech recognition apparatus, including a word sequence generator configured to generate a word sequence based on a phoneme sequence generated from a speech signal; a syllable sequence generator configured to generate a syllable sequence corresponding to a word element among words in the word sequence based on the phoneme sequence, wherein the word element is a word comprising a lower recognition rate than a threshold value among the words; and a text determiner processor configured to determine a text corresponding to a recognition result of the speech signal based on the word sequence and the syllable sequence.

The text determiner processor may be further configured to determine the text by substituting the word element in the word sequence for the syllable sequence.

The apparatus may also include a verification processor configured to verify whether a word element comprises a lower recognition rate than a threshold value among words of the word sequence.

In response to the verification processor verifying that the word element may include the lower recognition rate than the threshold rate among the words, the text determiner processor is further configured to determine the text corresponding to the recognition result of the speech signal based on the word sequence.

The word sequence generator may be further configured to generate the phoneme sequence by performing phoneme recognition on the speech signal based on an acoustic model.

The word sequence generator may be further configured to generate the word sequence by decoding the phoneme sequence in a word unit using a word unit phonetic dictionary and a word unit language model, where the word sequence is a text converted from the speech signal based on the speech recognition.

The syllable sequence generator may be further configured to identify a word most similar to the phoneme sequence generated from the speech signal among the words included in a word unit phonetic dictionary, and generate the word sequence from the phoneme sequence by combining the identified word based on a word unit language model.

The syllable sequence generator may be further configured to generate the syllable sequence corresponding to the word element in response to the word element having a lower recognition rate than a threshold rate, and generate a portion corresponding to the word element among phonemes included in the phoneme sequence as the syllable sequence by decoding a portion corresponding to the word element in a syllable unit.

Other features and aspects will be apparent from the following detailed description, the drawings, and the claims.

BRIEF DESCRIPTION OF THE DRAWINGS

FIG. 1A illustrates an example of a speech recognition apparatus, in accordance with an embodiment.

Figure 1B:
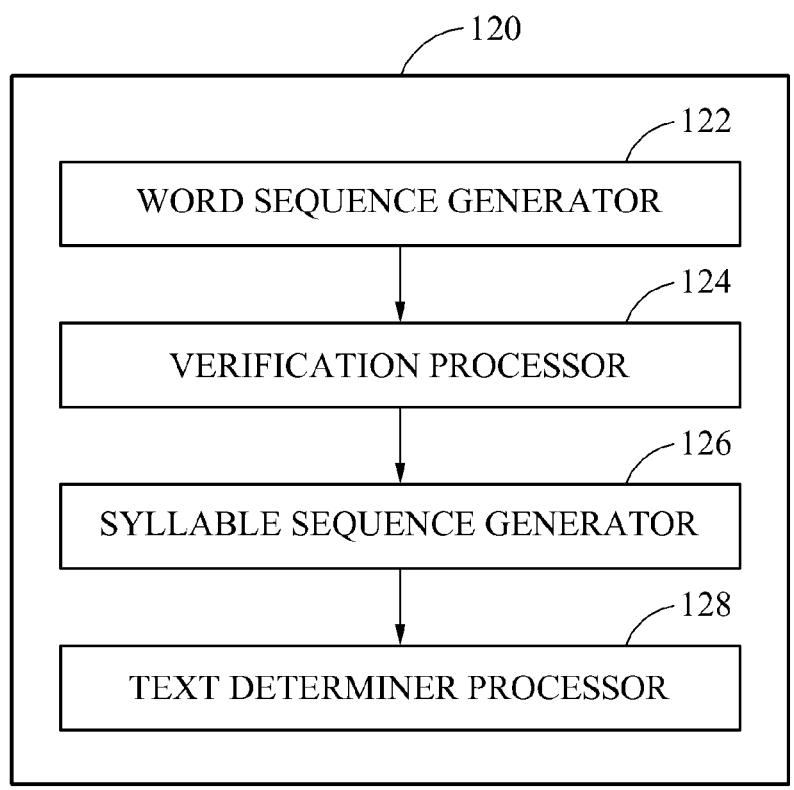
FIG. 1B illustrates an example of the processor of the speech recognition apparatus, in accordance with an embodiment.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

FIG. 1A illustrates an example of a speech recognition apparatus, in accordance with an embodiment.

Referring to FIG. 1A, a speech recognition apparatus 100 is an apparatus to convert a speech signal from a user into a text based on speech recognition. The speech recognition apparatus 100 includes a processor 120. The processor 120 is an intelligent central structural element of a computer or other information handling system. The processor 120 or central processing unit (CPU) responds to and processes the basic instructions that drive a computer. The speech recognition apparatus 100 also includes a microphone 110. The microphone 110 is a transducer that changes the air pressure of sound waves into electrical signal that can be recorded, amplified, and/or transmitted to another location. The speech recognition apparatus 100 is included in various modules to perform the speech recognition. The various modules configuring the speech recognition apparatus 100 are provided in a hardware module. The software module may be operated by at least one processor 120.

The microphone 110 receives a speech signal from a user and transmits the speech signal of the user to the processor 120. The microphone 110 is included or is part of the speech recognition apparatus 100. In an alternative embodiment, the microphone 110 is external to the speech recognition apparatus 100.

The processor 120 processes the speech signal from the user. The processor 120 converts the speech signal from the user into a corresponding text. In one example, the processor 120 receives the speech signal from the user directly from the microphone 110, from the microphone 110 through another structural element in the speech recognition apparatus 100, or from an external device.

The processor 120 extracts a feature vector from the speech signal. The processor 120 generates a phoneme sequence from the feature vector using an acoustic model. The phoneme sequence refers to a sequence of phonemes. A phoneme is a smallest unit of phonology having a function of distinguishing an intention in a language. The phoneme sequence also includes a probability in which each phoneme corresponds to actual phonemes.

The processor 120 generates a word sequence by decoding the phoneme sequence in a syllable unit. The processor 120 generates a syllable sequence by decoding the phoneme sequence in a word unit.

The processor 120 generates the word sequence from the phoneme sequence by performing the decoding of the word unit based on a word unit phonetic dictionary and a word unit language model. In this example, the word sequence is a sequence of words distinguished by word spacing in a text corresponding to a speech recognition result.

The word unit phonetic dictionary is generated by modeling the phoneme sequence constituting a word. The word unit phonetic dictionary includes a table including a word and a phoneme sequence corresponding to the word. Accordingly, the processor 120 generates words from the phoneme sequence using the word unit phonetic dictionary.

The word unit language model is generated by modeling a word sequence included in a sentence. The word unit language model includes a table including a sentence and a word sequence corresponding to the sentence. Accordingly, the processor 120 generates a word sequence from the words using the word unit language model. In this example, based on the word unit language model, the processor 120 verifies whether a predetermined sentence is grammatically or semantically appropriate. For example, based on the word unit language model, the processor 120 verifies that a sentence "I eat an apple" is more appropriate than a sentence "an apple eats me."

When a syllable unit decoding is performed, the processor 120 generates a syllable sequence from a phoneme sequence by performing the syllable unit decoding based on a syllable unit phonetic dictionary and a syllable unit language model. In this example, the syllable sequence refers to syllables constituting a word. The syllables constituting a word is a sequence of syllables corresponding to a unit of a voice having a single phonetic value.

The syllable unit phonetic dictionary is generated by modeling a phoneme sequence constituting a word. The syllable unit phonetic dictionary includes a table including a syllable and a phoneme sequence corresponding to the syllable. Accordingly, the processor 120 generates syllables from the phoneme sequence using the syllable unit phonetic dictionary.

A syllable unit language model is generated by modeling a syllable sequence forming a word. The syllable unit language model includes a table including a word and a syllable sequence corresponding to the word. Accordingly, the processor 120 generates the syllable sequence from syllables using the syllable unit language model. In this example, based on the syllable unit language model, the processor 120 verifies whether a predetermined word is grammatically or semantically appropriate.

The processor 120 generates the word sequence from the phoneme sequence by performing a word unit decoding. The processor 120 substitutes any one of words included in the word sequence for a syllable sequence generated based on the syllable unit decoding. The processor 120 determines a text corresponding to a recognition result of the speech signal by combining the word sequence and the syllable sequence. A process of determining the text corresponding to the recognition result of a speech signal in the processor 120 will be described with reference to FIGS. 2 and 3.

FIG. 1B illustrates an example of the processor 120 of the speech recognition apparatus 100, in accordance with an embodiment.

A word sequence generator 122 is configured to generate a word sequence based on a phoneme sequence generated from a received speech signal. The word sequence generator 122 extracts a feature vector from the speech signal. The word sequence generator 122 generates the phoneme sequence from the feature vector by performing a phoneme recognition based on an acoustic model. The word sequence generator 122 generates the word sequence by decoding the phoneme sequence in a word unit. The word sequence generator 122 performs a word unit decoding based on a word unit phonetic dictionary and a word unit language model. The word sequence constitutes a text converted from the speech signal based on the speech recognition.

The verification processor 124 verifies whether a word element having a lower recognition rate than a threshold value among words constituting the word sequence exists. The threshold value is determined or defined by a user in advance or relatively determined based on recognition rates of the words. In one example, the word element is a word having a lower recognition rate than a relative threshold value determined based on recognition rates of words among the words included in the word sequence. In another example, the verification processor 124 sets as the threshold value as a value input from the user.

In response to the word element having the lower recognition rate than the threshold value verified to exist, a syllable unit decoder 126 generates a syllable sequence corresponding to the word element. A syllable unit decoder 126 is configured to generate a syllable sequence corresponding to any one word element among words included in the word sequence based on the phoneme sequence. The word element is a word having a lower recognition rate than a threshold value among the words included in the word sequence. In an example, the word element is a word having a lower recognition rate than a predetermined threshold value among words included in a word sequence.

Hereinafter, the syllable sequence generator 126 generates the syllable sequence corresponding to a word element by performing a process as described with reference to FIG. 3.

A text determiner processor 128 is configured to determine a text corresponding to a recognition result of the speech signal based on the word sequence and the syllable sequence. The text determiner processor 128 is configured to determine the text by substituting the word element in the word sequence for the syllable sequence.

In another example, in response to the word element having a lower recognition rate than the threshold rate among words included in a word sequence verified to exist, the text determiner processor 128 is configured to determine the text corresponding to the recognition result of the speech signal based on the word sequence.

In accordance with an illustrative configuration, the word sequence generator 122, the verification processor 124, the syllable sequence generator 126, and the text determiner processor 128 are structural or hardware elements, modules, or devices.

Figure 2:
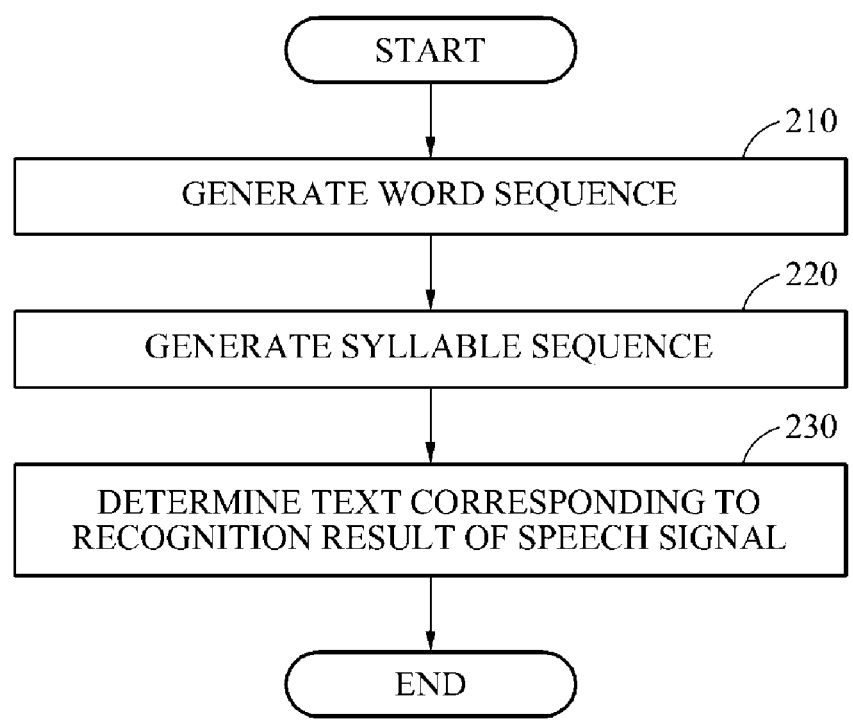
FIG. 2 illustrates an example of a speech recognition method, in accordance with an embodiment.

FIG. 2 illustrates an example of a speech recognition method, in accordance with an embodiment.

The word sequence generator 122, the verification processor 124, the syllable sequence generator 126, and the determiner processor 128 included in the processor 120 perform the speech recognition method. For sake of conciseness and clarity, each function described in FIG. 2 is described as being performed by the processor 120.

In operation 210, the processor 120 generates a word sequence based on a phoneme sequence generated from a received speech signal. The processor 120 extracts a feature vector from the speech signal. The processor 120 generates the phoneme sequence from the feature vector by performing a phoneme recognition based on an acoustic model. The processor 120 generates the word sequence by decoding the phoneme sequence in a word unit. The processor 120 performs a word unit decoding based on a word unit phonetic dictionary and a word unit language model. As previously described, the word sequence constitutes a text converted from the speech signal based on the speech recognition.

In operation 220, the processor 120 generates a syllable sequence corresponding to any one word element among words included in the word. As previously explained, the word element is a word having a lower recognition rate than a threshold value among the words included in the word sequence. In an example, the word element is a word having a lower recognition rate than a predetermined threshold value among words included in a word sequence. The processor 120 sets a threshold value input from the user as a predetermined threshold value. In another example, the word element is a word having a lower recognition rate than a relative threshold value determined based on recognition rates of words among the words included in the word sequence.

The processor 120 generates the syllable sequence from the phoneme sequence corresponding to the word element. Hereinafter, a process of generating a syllable sequence corresponding to a word element will be described with reference to FIG. 3.

In operation 230, the processor 120 determines a text corresponding to a recognition result of the speech signal based on the word sequence and the syllable sequence. The processor 120 determines the text by substituting the word element in the word sequence for the syllable sequence.

In another example, in response to the word element having a lower recognition rate than the threshold rate among words included in a word sequence verified to exist, the processor 120 determines the text corresponding to the recognition result of the speech signal based on the word sequence.

Figure 3:
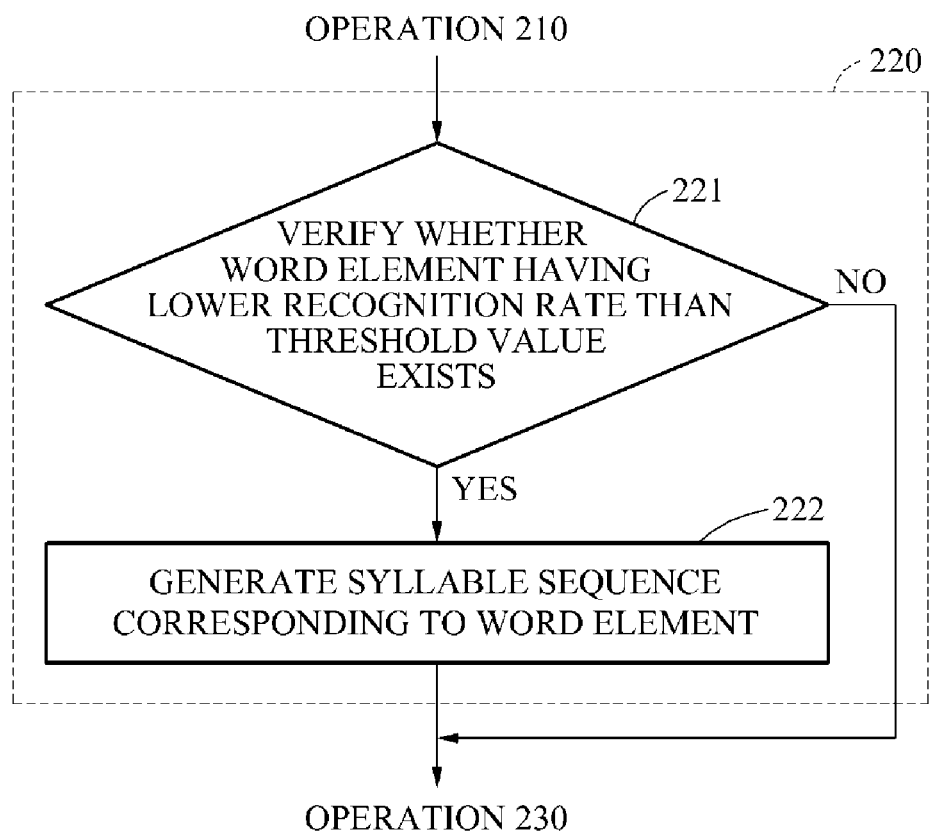
FIG. 3 illustrates an example of generating a syllable sequence, in accordance with an embodiment.

FIG. 3 illustrates an example of generating a syllable sequence, in accordance with an embodiment. In accord with an illustrative example, the syllable sequence corresponds to a word element having a lower recognition rate than a threshold value.

The syllable sequence generator 126 in the processor 120 performs the generating of the syllable sequence. For sake of conciseness and simplicity, each function described in FIG. 3 is described as being performed by the processor 120.

In operation 221, the processor 120 verifies whether a word element having a lower recognition rate than a threshold value among words included in a word sequence exists.

The word sequence is formed by words included in a word unit phonetic dictionary. The processor 120 identifies a word most similar to a phoneme sequence generated from a speech signal among the words included in the word unit phonetic dictionary. The processor 120 generates the word sequence from the phoneme sequence by combining the identified words based on a word unit language model. When speech recognition is performed on a word not included in the word unit phonetic dictionary, the processor 120 recognizes the corresponding word by identifying a word most similar to a word to be speech recognized among the words included in the word unit phonetic dictionary. However, a recognition rate of the corresponding word may be relatively low. In one illustrative example, a threshold value is a reference value used to verify whether a word element corresponding to a word not included in the word unit phonetic dictionary among the words included in the word sequence exists.

For example, the threshold value is a predetermined threshold value or includes a relative threshold value determined based on recognition rates of the words included in the word sequence. The predetermined threshold value is a value input from a user. The relative threshold value is determined based on an average value of the recognition rates of the words. The relative threshold value is also determined based on an interval defined as a maximum value and a minimum value of the recognition rates of the words. However, the determining of the threshold value is not limited to the foregoing descriptions and various and alternative methods may be applicable to the setting of the threshold value.

In operation 222, in response to a word element having a lower recognition rate than the threshold rate verified to exist, the processor 120 generates the syllable sequence corresponding to the word element. The processor 120 generates a portion corresponding to the word element among the phonemes included in the phoneme sequence as a syllable sequence based on a syllable.

The processor 120 generates, among phonemes included in the phoneme sequence, the syllable sequence by decoding a portion corresponding to the word element in a syllable unit. In this example, the processor 120 performs a syllable unit decoding based on the syllable unit phonetic dictionary and the syllable unit language model. The syllable unit phonetic dictionary includes a table including a syllable and a phoneme sequence corresponding to the syllable. The syllable unit language model includes a table including a syllable and a syllable sequence corresponding to the syllable.

The syllable sequence is a word not included in the word unit phonetic dictionary used to generate the word sequence by decoding the phoneme sequence in a word unit.

In operation 230, the processor 120 determines a text corresponding to a recognition result of the speech signal by combining the word sequence and the syllable sequence. Hereinafter, a process of determining a text corresponding to a recognition result will be described with reference to FIG. 4.

In response to a word element having a lower recognition rate than a threshold rate verified not to exist, the processor 120 skips operation 222 and performs operation 230. The processor 120 determines the text corresponding to the recognition result of speech signal based on the word sequence.

Figure 4:
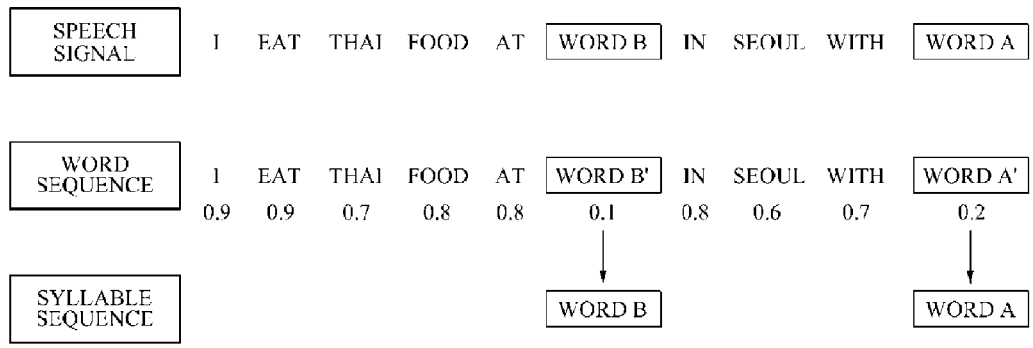
FIG. 4 illustrates an example of applying a speech recognition method, in accordance with an embodiment.

FIG. 4 illustrates an example of applying a speech recognition method, in accordance with an embodiment.

Referring to FIG. 4, an example of a sentence for describing the speech recognition method is detailed. In this example, a [word A] and a [word B] may refer to different words. Although a [word A'] and the [word A] are phonetically similar, the [word A'] and the [word A] refer to different or non-identical words. Similarly, although a [word B'] and the [word B] are phonetically similar, the [word B'] and the [word B] refer to different or non-identical words.

FIG. 4 illustrates a case in which a speech signal corresponding to "I eat Thai food at [word B] in Seoul with [word A]" is obtained from a user. In this example, the [word A] refers to a word for a name of a person and the [word B] refers to a word for a name of a restaurant. The [word A] and the [word B] refer to words not included in the syllable unit phonetic dictionary and the [word A'] and the [word B'] refer to words included in the syllable unit phonetic dictionary.

A speech recognition apparatus generates a word sequence by decoding a phoneme sequence generated from a speech signal in a word unit. The generated word includes words and recognition rates of the corresponding words. A recognition rate may have a value between "0" and "1". The closer the recognition rate is to "1", the more accurate recognition of the corresponding words. Conversely, the closer the recognition rate is to "0", the less accurate recognition of the corresponding words.

For example, a phoneme sequence constituting a word matched to words included in a word unit phonetic dictionary is decoded at a high recognition rate. Conversely, a phoneme sequence constituting a word not matching to words included in the word unit phonetic dictionary is decoded at a low recognition rate.

In the word sequence illustrated in FIG. 4, remaining words aside from the [word A'] and the [word B'] are the words included in the word unit phonetic dictionary and are decoded at a higher recognition rate than a threshold value "0.3". Because the [word A] and the [word B] are not included in the word unit phonetic dictionary, the speech recognition apparatus does not recognize the [word A] and the [word B] from the phoneme sequence and decodes instead the phoneme sequence with the [word A'] and the [word B'] which are the most similar to the [word A] and the [word B]. Therefore, the [word A'] and the [word B'] may have lower recognition rates "0.2" and "0.1", respectively, than a threshold value "0.3".

The speech recognition apparatus verifies that the [word A'] and the [word B'] are word elements having lower recognition rates than threshold values exist. In response, the speech recognition apparatus generates syllable sequences by decoding phoneme sequences corresponding to the [word A'] and the [word B'] in a syllable unit. In this example, the speech recognition apparatus performs decoding in a syllable unit based on the syllable unit phonetic dictionary and a syllable unit language model. The speech recognition apparatus generates the syllable sequence [word A] by decoding the phoneme sequence corresponding to the [word A'] in a syllable unit. Similarly, the speech recognition apparatus generates the syllable sequence [word B] by decoding the phoneme sequence corresponding to the [word B'] in a syllable unit.

The speech recognition apparatus determines a text corresponding to a speech recognition result by substituting the word elements [word A'] and [word B'] in the word sequence for the syllable sequence [word A] and [word B], respectively. Concisely, the text "I eat Thai food at [word B] in Seoul with [word A]" is determined to be the speech recognition result.

Figure 5A:
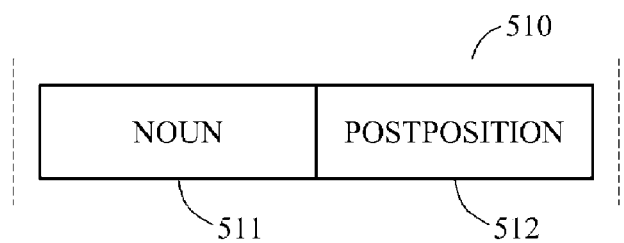
FIGS. 5A and 5B illustrate examples of words having various structures in a predetermined language, in accordance with an embodiment.
Figure 5B:
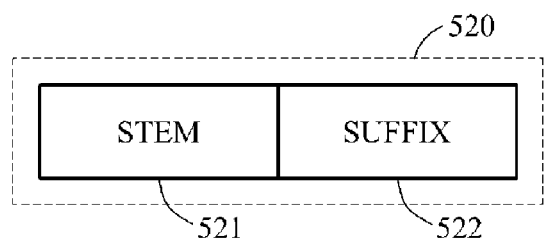

FIGS. 5A and 5B illustrate examples of words having various structures in a predetermined language, in accordance with an embodiment.

The speech recognition method is applied to a language using various forms of words. For example, the language including various forms of words may be Korean, Japanese, Chinese, and other languages.

In an example, a word 510 is constituted by a noun 511 and a postposition 512. In this example, the noun 511 is a part of speech that refers to a name of object and includes a name of person, a name of place, a name of product, and other similar names. The postposition 512 is used with the noun 511. The postposition 512 is a part of speech that indicates a grammatical relationship between the noun 511 and the other nouns and supplements an intention of the noun 511. In a language including words in various forms, a single noun 511 is combined with various postpositions 512 and constitutes different words.

In another example, a word 520 is constituted by a stem 521 and a suffix 522. In this example, the stem 521 refers to an unchangeable portion according to an intention and a position of the word 520 when the word 520 corresponding to a verb and an adjective is used in a sentence. The suffix 522 refers to a changeable portion according to the intention and the position of the word 520 when the word 520 corresponding to a verb and an adjective used in a sentence. In a language including words in various forms, a single stem 521 is combined with various suffixes 522 and constitutes different words.

Because there are various types of words in a language including various forms of words, the word unit phonetic dictionary may be difficult to include every word. However, the speech recognition method, in accordance with an embodiment, performs accurate speech recognition in lieu of including every word in the word unit phonetic dictionary using a word unit decoding and a syllable unit decoding.

Figure 6:
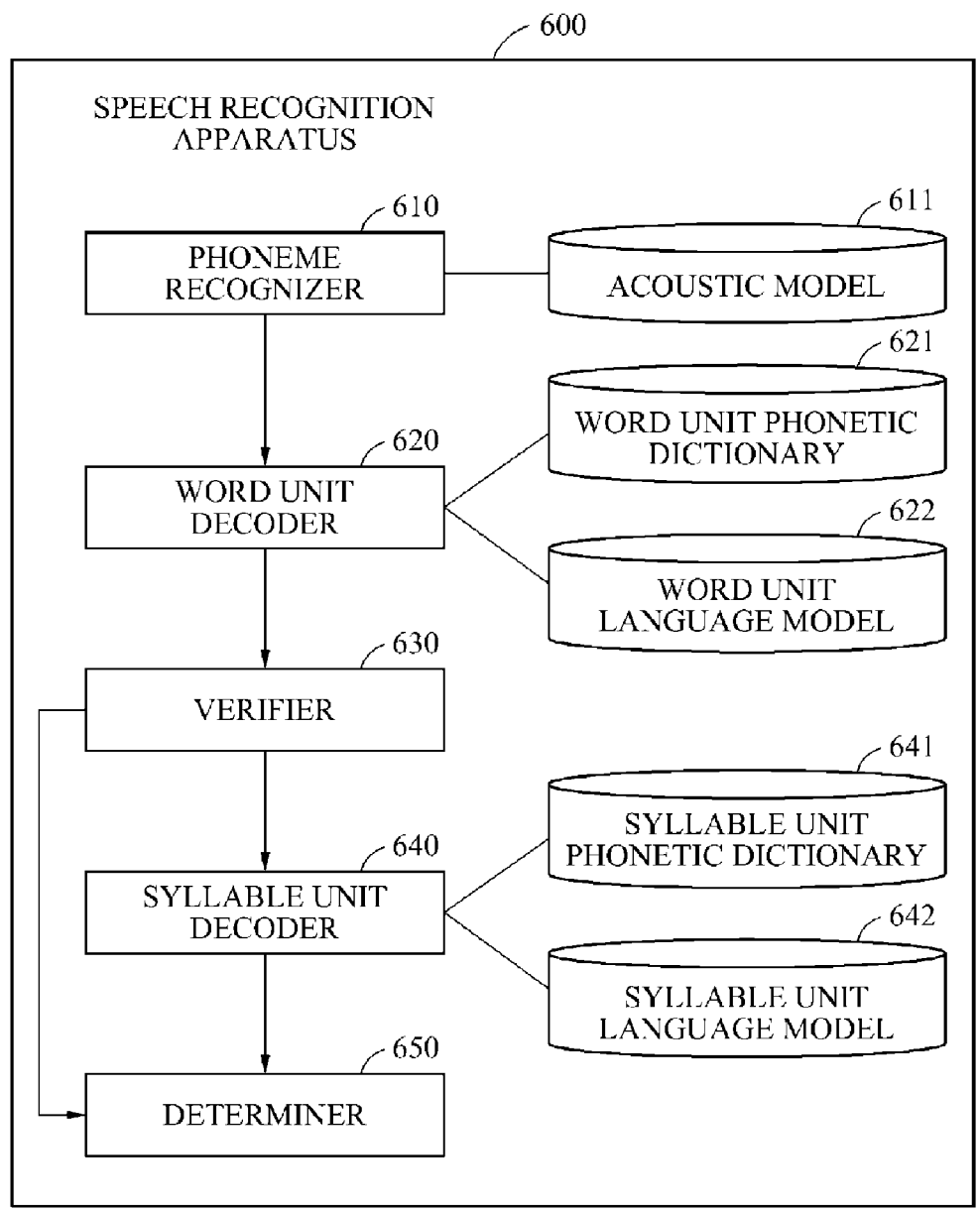
FIG. 6 illustrates an example of a configuration of a speech recognition apparatus, in accordance with an embodiment.

FIG. 6 illustrates an example of a configuration of a speech recognition apparatus, in accordance with an embodiment.

Referring to FIG. 6, a speech recognition apparatus 600 includes a phoneme recognizer 610, a word unit decoder 620, a verifier 630, a syllable unit decoder 640, and a determiner 650. An acoustic model 611, a word unit phonetic dictionary 621, a word unit language model 622, a syllable unit phonetic dictionary 641, and a syllable unit phonetic dictionary 642 may be included in the speech recognition apparatus 600, or may be external to the speech recognition apparatus 600.

The phoneme recognizer 610 generates a phoneme sequence from a speech signal. The phoneme recognizer 610 extracts a feature vector from the speech signal and generates the phoneme sequence from the feature vector using the acoustic model 611.

The word unit decoder 620 generates a word sequence by decoding the phoneme sequence in a word unit. For example, the word unit decoder 620 generates a word sequence from a phoneme sequence using the word unit phonetic dictionary 621 and the word unit language model 622. The word sequence constitutes a text converted from the speech signal based on speech recognition.

The verifier 630 verifies whether a word element having a lower recognition rate than a threshold value among words constituting the word sequence exists. The threshold value is determined or defined by a user in advance or relatively determined based on recognition rates of the words.

In response to the word element having the lower recognition rate than the threshold value verified to exist, the syllable unit decoder 640 generates a syllable sequence corresponding to the word element. The syllable unit decoder 640 generates the syllable sequence by decoding a portion corresponding to the word element among words included in the phoneme sequence in a syllable unit. In such an example, the syllable unit decoder 640 performs syllable unit decoding using the syllable unit phonetic dictionary 641 and the syllable unit language model 642.

The determiner 650 determines a text corresponding to a recognition result of the speech signal based on the word sequence and the syllable sequence. The determiner 650 combines the word sequence and the syllable sequence. For example, the determiner 650 combines a word sequence and a syllable sequence by substituting a word element in a word sequence for a syllable sequence and determines a text corresponding to a speech recognition result as a result of the combining.

In accordance with an illustrative example, accuracy in speech recognition is effectively enhanced by performing a syllable unit decoding on a word element having a low recognition rate among words included in a word sequence generated by a word unit decoding.

Words not defined in a word unit dictionary, such as a name of a place, a name of a person, a name of a product, neologism, and other names, may be accurately recognized by performing speech recognition using a word unit decoding and a syllable unit decoding.

Because a size of a phonetic dictionary is limited, words not included in a word unit phonetic dictionary may be accurately recognized by performing speech recognition using a word unit decoding and a syllable unit decoding.

Accurate speech recognition is performed on a language including words in various forms by performing the speech recognition using a word unit decoding and a syllable unit decoding.

The apparatuses, recognizers, decoders, verifiers, decoders, determiners, modules, devices, and other structural components illustrated in FIGS. 1A, 1B, and 6 that perform the operations described herein with respect to FIGS. 2-3 are implemented by hardware components. Examples of hardware components include controllers, sensors, generators, drivers, and any other electronic components known to one of ordinary skill in the art. In one example, the hardware components are implemented by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein with respect to FIGS. 2-3. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 2-3 that perform the operations described herein with respect to FIGS. 2-3 are performed by a processor or a computer as described above executing instructions or software to perform the operations described herein.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A speech recognition method, comprising:
generating, by a processor, a word sequence based on a phoneme sequence generated from a speech signal;
generating, by the processor, a syllable sequence based on the phoneme sequence, in response to a word element among words included in the word sequence having a lower recognition rate than a threshold value; and
determining, by the processor, a text corresponding to a recognition result of the speech signal based on the word sequence and the syllable sequence,
wherein the syllable sequence corresponds to the word element,
wherein the generating of the syllable sequence comprises generating the syllable sequence by decoding a portion corresponding to the word element, among phonemes included in the phoneme sequence, and
wherein the word sequence is generated by decoding the phoneme sequence and corresponds to at least the text corresponding to the recognition result of the speech signal.

2. The method of claim 1, wherein the determining of the text comprises determining the text by substituting the word element in the word sequence for the syllable sequence.

3. The method of claim 1, wherein the threshold value comprises a relative threshold value determined based on recognition rates of the words included in the word sequence.

4. The method of claim 1, wherein the generating of the syllable sequence based on the phoneme sequence comprises generating the syllable sequence by decoding a syllable unit using a syllable unit phonetic dictionary, in which a phoneme sequence comprising a syllable is modeled, and a syllable unit language model, in which a syllable sequence comprising a word is modeled.

5. The method of claim 1, wherein the syllable sequence comprises a word excluded from a word phonetic dictionary used to generate the word sequence based on the phoneme sequence.

6. A speech recognition method, comprising:
generating, by a processor, a word sequence by decoding a phoneme sequence generated from a speech signal;
generating, by the processor, a syllable sequence corresponding to a word element, among words included in the word sequence, based on the phoneme sequence, in response to the word element comprising a lower recognition rate than a threshold value; and
determining, by the processor, a text corresponding to a recognition result of the speech signal based on the word sequence and the syllable sequence,
wherein the generating of the syllable sequence comprises generating the syllable sequence by decoding a portion corresponding to the word element among phonemes included in the phoneme sequence.

7. The method of claim 6, wherein the determining of the text comprises determining by substituting the word element in the word sequence for the syllable sequence.

8. The method of claim 6, wherein the threshold value is one of a threshold value from the user and a relative threshold value determined based on recognition rates of the words included in the word sequence.

9. A non-transitory computer-readable medium storing instructions that, when executed by the processor, cause the processor to perform the method of claim 1.

10. A speech recognition apparatus, comprising:
a processor configured to
process a received speech signal,
generate a word sequence based on a phoneme sequence generated from the speech signal,
generate a syllable sequence corresponding to a word element among words included in the word sequence, based on decoding a portion corresponding to the word element among phonemes included in the phoneme sequence, in response to the word element having a lower recognition rate than a threshold value, and
determine a text corresponding to a recognition result of the speech signal based on the word sequence and the syllable sequence,
wherein the word sequence is generated by decoding the phoneme sequence and corresponds to at least the text corresponding to the recognition result of the speech signal.

11. The apparatus of claim 10, wherein the processor is configured to determine the text by substituting the word element in the word sequence for the syllable sequence.

12. The apparatus of claim 10, wherein the threshold value comprises a threshold value determined based on recognition rates of the words included in the word sequence.

* * * * *